US006982887B2

(12) United States Patent
Batarseh et al.

(10) Patent No.: US 6,982,887 B2
(45) Date of Patent: Jan. 3, 2006

(54) DC-DC CONVERTER WITH COUPLED-INDUCTORS CURRENT-DOUBLER

(75) Inventors: Issa Batarseh, Oviedo, FL (US); Jaber Abu-Qahouq, Orlando, FL (US); Hong Mao, Orlando, FL (US)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 10/832,103

(22) Filed: Apr. 26, 2004

(65) Prior Publication Data

US 2005/0237772 A1    Oct. 27, 2005

(51) Int. Cl.
 *H02M 5/42* (2006.01)
(52) U.S. Cl. ............................. 363/89; 363/90; 363/82
(58) Field of Classification Search ............... 363/89, 363/90, 82, 126, 127
See application file for complete search history.

(56) References Cited

U.S. PATENT DOCUMENTS

| | | | |
|---|---|---|---|
| 4,581,690 A | * | 4/1986 | Russell .................... 363/17 |
| 4,899,271 A | * | 2/1990 | Seiersen ................... 363/126 |
| 5,008,795 A | | 4/1991 | Parsley et al. |
| 5,335,163 A | * | 8/1994 | Seiersen ................... 363/126 |
| 5,508,903 A | | 4/1996 | Alexndrov |
| 5,555,494 A | * | 9/1996 | Morris ..................... 363/17 |
| 5,784,266 A | * | 7/1998 | Chen ....................... 363/16 |
| 5,808,879 A | | 9/1998 | Liu et al. |
| 5,933,338 A | | 8/1999 | Wallace |
| 6,163,466 A | | 12/2000 | Davila, Jr. et al. |
| 6,388,898 B1 | | 5/2002 | Fan et al. |
| 6,400,582 B1 | | 6/2002 | Hemena et al. |
| 6,538,905 B2 | | 3/2003 | Greenfield et al. |
| 6,549,436 B1 | | 4/2003 | Sun |

FOREIGN PATENT DOCUMENTS

JP        11055941 A     2/1999

OTHER PUBLICATIONS

Balog et al., "Coupled Inductors-A Basic Filter Building Block," 8 pages. no date.
Xunwei Zhou, "Low-Voltage High-Efficiency Fast Transient Voltage Regulator Modules", Ph.D. Dissertation, Virginia Polytechnic Inst. State Univ., Blacksburg, 1999, pp. 1-211.
Y. Panov and M. Jovanovic, "Design and Performance Evaluation of Low-Voltage/High-Current DC/DC On-Board Modules," IEEE Fourteenth Annual Applied Power Electronics Conference and Exposition, APEC'99, vol. 1, pp. 545-552, no date.
Sam Davis, "Power Supply R&D: Reactive or Proactive?" Power Electronics Technology Magazine- Editor's Viewpoint, Jan. 2002.
Wong, F. Lee, X. Zhou and J. Chen, "Voltage Regulator Module (VRM) Transient Modeling and Analysis," IEEE 34k Annual Industry Applications Conference Record, IAS'99, vol. 3, pp. 1669-1676, 1999.

(Continued)

*Primary Examiner*—Shawn Riley
(74) *Attorney, Agent, or Firm*—Harness, Dickey & Pierce, P.L.C.

(57) ABSTRACT

A coupled-inductor current-doubler topology for a power converter has first and second rectifiers and first and second coupled inductors. Each coupled inductor has a main inductor inductively coupled with a secondary inductor. The secondary inductor of the first coupled inductor is coupled in series with one of the first and second rectifiers and the secondary inductor of the second coupled inductor coupled in series with the other one of the first and second rectifiers.

15 Claims, 11 Drawing Sheets

OTHER PUBLICATIONS

B. Arbetter and D. Maksimocic, "DC-DC Converter with Fast Transient Response and High Efficiency for Low-Voltage Microprocessor Loads," IEEE Thirteenth Annual Applied Power Electronics Conference and Exposition, APEC'98, vol. 1, pp. 156-162, 1998.

Y. Panov and M. Jovanovic, "Design and Performance Evaluation of Low-Voltage/High-Current DC/DC On-Board Modules," IEEE Transactions on Power Electronics, vol. 16, No. 1, pp.: 26-33, Jan. 2001.

Nasser H. Kutkut, "A Full Bridge Soft Switched Telecom Power Supply with a Current Doubler Rectifier," 19th International Telecommunications Energy Conference, INTELEC 1997, Page(s): 344-351.

Alex Wizman and Chee-Yee Chung, "Extended Adaptive Voltage Positioning (EAVP)," IEEE Conference on Electrical Performance of Electronic Packaging, 2000, Page(s): 65-68.

M. Rico, J. Uceda, J. Sebastian, and F. Aldana, "Static and Dynamic Modeling of Tapped-Inductor DC-DC Converters", IEEE Power Electronics Specialists Conference, PESC'87, pp.: 28 1-288, 1987.

Ching-Jung Tseng; Chern-Lin Chen, "Passive lossless snubbers for DC/DC converters", Applied Power Electronics Conference and Exposition, 1998. APEC' 98, vol. 2, pp.: 1049-1054.

* cited by examiner

DC-DC CONVERTER WITH COUPLED-INDUCTORS CURRENT-DOUBLER

FIELD OF THE INVENTION

The present invention relates to power converters, and more particularly, to a coupled-inductors current-doubler topology for a power converter such as a DC-DC power converter.

BACKGROUND OF THE INVENTION

Point-of-load DC-DC converters for present and future generations of ICs for communication systems and microprocessors must have challenging specifications that include low output voltage and high output current with tight regulation, very small ripple under both steady-state and transient conditions, high power and current densities and high efficiency. All these requirements must be achieved at a very low output voltage that is expected to drop below 1V in the next few years, below 0.6V by year 2010, and below 0.4V by year 2016. Since these devices are required to draw high current, that may exceed 100 A in the future, the power demand will increase dramatically. Therefore, DC-DC converter topologies with higher input voltages may be preferred over those having lower input voltages.

Most of today's non-isolated low-voltage, high-current DC-DC converters are buck derived. Today's isolated DC-DC converters for higher input voltages include symmetrical and asymmetrical half-bridge, full-bridge, active clamped forward, flyback forward and push-pull. The secondary side of the isolated DC-DC converter topology can have different topologies such as forward, center-tapped, or current-doubler.

As the required output voltages become smaller and the input voltages become larger, the required voltage step-down ratio becomes larger, which means larger isolation transformer turns ratio in isolated converters or smaller switching duty cycles in non-isolated converters. Smaller duty switching cycles result in a higher input peak current (higher input rms current) and a larger asymmetric transient response. Moreover, lower output voltage converters must have tight regulation, which requires lower output current and voltage ripple.

As the required output current increases, the isolation transformer secondary winding current becomes larger which increases the winding losses and results in thermal problems that may block the ability to reduce the transformer size required to achieve higher density.

The current-doubler topology is preferred for the secondary side in many power converter applications owing to its advantages including current ripple cancellation, higher current capability, doubled output current and voltage ripple frequency compared to its switches switching frequency, and lower rectification and conduction losses. FIG. 1A shows a conventional prior art current-doubler (CCD) topology 100 that can be used as the secondary side in a DC-DC converter, such as DC-DC converter 600 (FIG. 6A). CCD topology 100 is coupled across a secondary winding 607 (FIG. 6A) of a transformer T$_1$ (FIG. 6A) at nodes A, B. A rectifier, shown as diode D$_2$, has a cathode coupled to one side of the secondary winding 607 of the transformer T$_1$ at node A and to one side of a first inductor L$_1$. A second rectifier, shown as diode D$_2$, has a cathode coupled to the other side of the secondary winding 607 of the transformer T$_1$ at node B and to one side of a second inductor L$_2$. The other sides of inductors L$_1$, L$_2$ are coupled together and to one side of an output 104 (R$_o$ represents the load at output 104). A filter capacitor C$_o$ is coupled across output 104. The other side of output 104 is coupled to the anodes of diodes D$_1$ and D$_2$. FIG. 1B shows the key waveforms for a DC-DC converter, such as DC-DC converter 600 (FIG. 6A), having conventional current-doubler topology 100. While the rectifiers shown as diodes D$_1$, D$_2$ can be diodes, it should be understood that rectifiers other than diodes can be used, such as synchronous rectifiers.

However, there are other characteristics that are preferred for the current-doubler when it is used in low output voltage, high output current DC-DC converters with higher input voltages. These include lower output current ripple without increasing the switching frequency much to achieve lower output voltage ripple with the smallest output capacitance, lower output voltage without decreasing the duty cycle or increasing the isolation transformer turns ratio (larger step down capability), lower input current, and that it can be designed to achieve symmetric transient response at both step-up and step-down transients. The latter is preferred in the Adaptive Voltage Positioning (AVP) technique used to reduce the output capacitance required for certain transient maximum output voltage deviation.

SUMMARY OF THE INVENTION

A coupled-inductor current-doubler topology for a power converter, includes first and second rectifiers and first and second coupled inductors. Each coupled inductor has a main inductor inductively coupled with a secondary inductor. The secondary inductor of the first coupled inductor is coupled in series with one of the first and second rectifiers and the secondary inductor of the second coupled inductor coupled in series with the other one of the first and second rectifiers.

In an aspect of the invention, the power converters is a DC-DC converter.

In an aspect of the invention, the power converter has a primary side coupled to a secondary side, the secondary side including the coupled-inductors current-doubler topology.

In an aspect of the invention, the power converter is a two-stage half-bridge buck converter with the coupled-inductors current-doubler topology used as the second stage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2A:
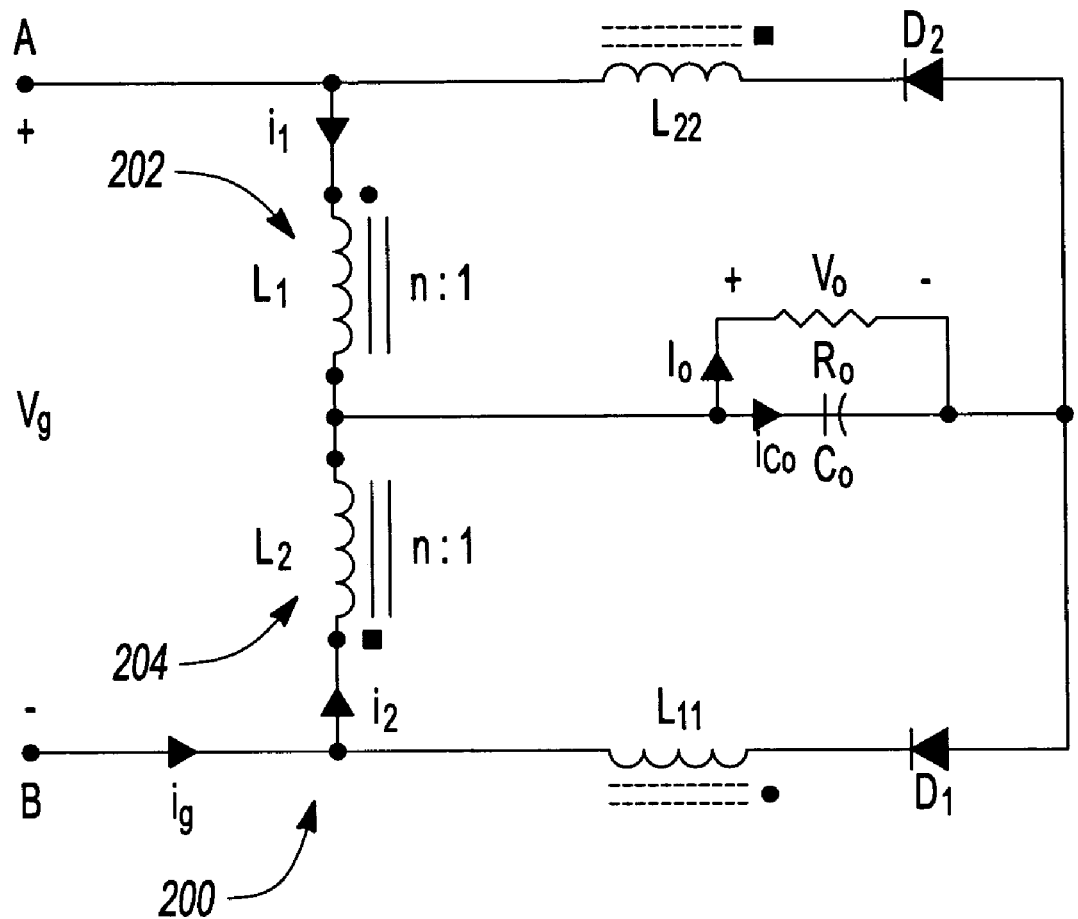
FIG. 2A is a schematic of a coupled-inductors current-doubler topology in accordance with the invention.
Figure 6A:
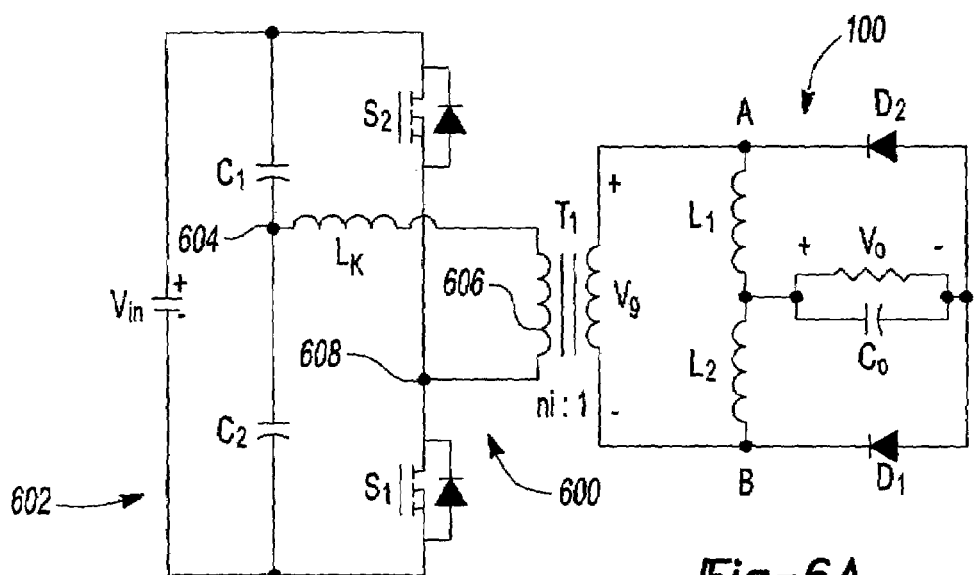
FIG. 6A shows an isolated half-bridge DC-DC converter using the conventional current-doubler topology of FIG. 1 as the secondary side.
Figure 6B:
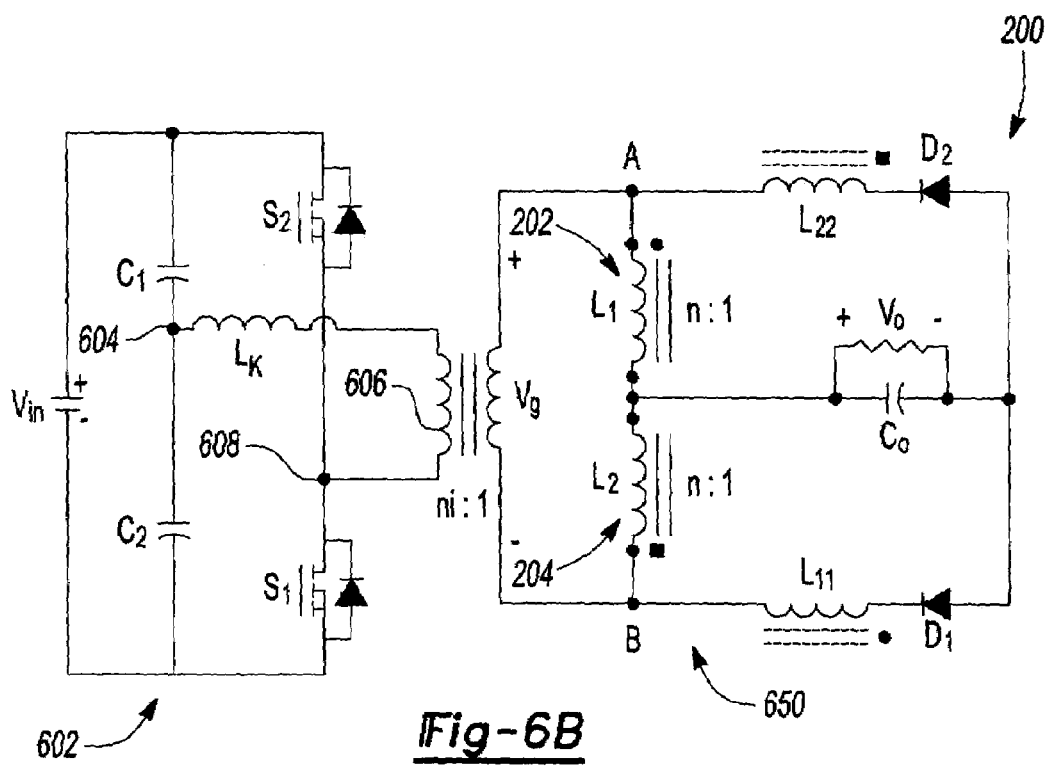
FIG. 6B shows an isolated half-bridge DC-DC converter in accordance with an aspect of the invention using the coupled-inductors current-doubler topology of FIG. 2A as the secondary side.

FIG. 2A shows a coupled inductors current-doubler (CICD) topology 200 in accordance with the invention for a power converter, such as for the secondary side of a DC-DC converter (such as DC-DC converter 650 shown in FIG. 6B). In CICD topology 200, a first coupled inductor 202 has a main inductor $L_1$ inductively coupled with a secondary inductor $L_{11}$ that is in series with a first rectifier, shown as diode $D_1$, with a turns ratio n:1 where n>1, and a second coupled inductor 204 has a main inductor $L_2$ inductively coupled with an inductor $L_{22}$ that is in series with a second rectifier, shown as diode $D_2$, with the same turns ratio. It should be understood that rectifiers other than diodes can be used for the rectifiers shown as $D_1$, $D_2$, such as synchronous rectifiers which can be advantageously used for low output voltage applications.

Assuming that the coupling coefficient k is equal to one, the coupled inductors turns ratio, n, is defined as:

$$n = \sqrt{\frac{L_1}{L_{11}}} = \sqrt{\frac{L_2}{L_{22}}} > 1, L_1 = L_2 = L, L_{11} = L_{22} \quad \text{(Equation 1)}$$

Figure 1:
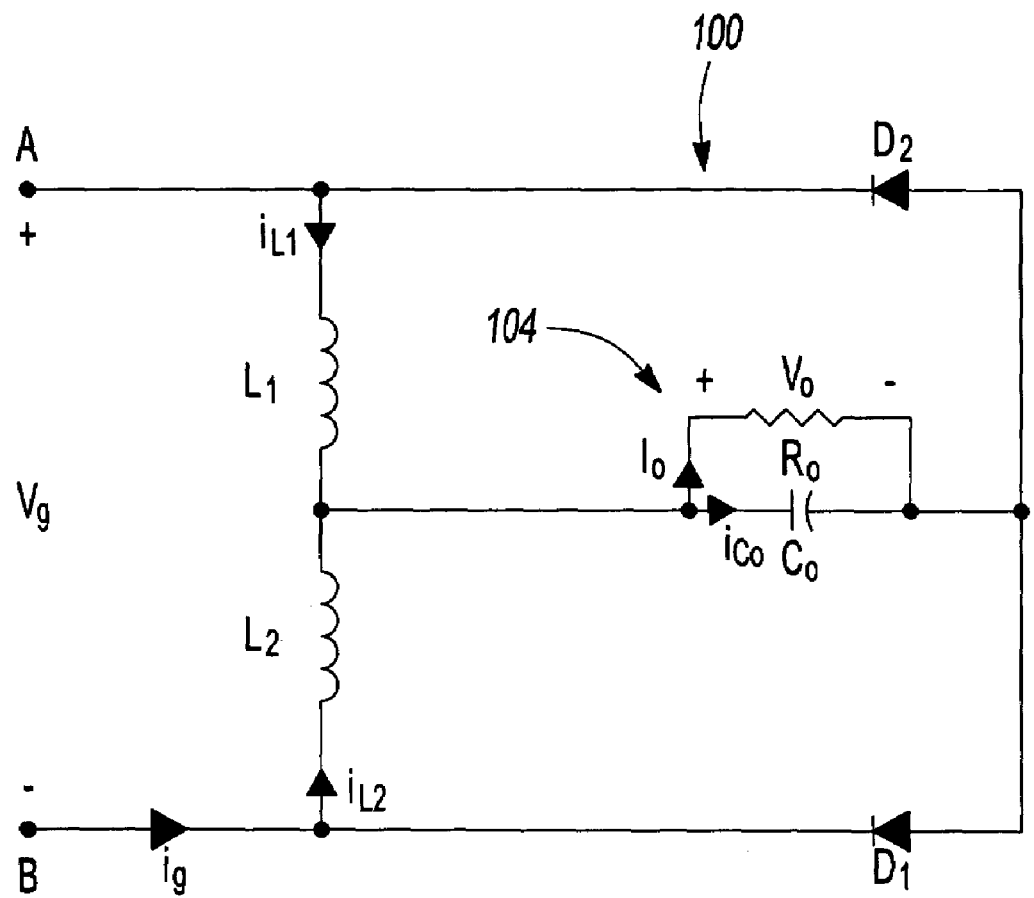
FIG. 1A is a schematic of a prior art conventional current-doubler topology.
FIG. 1B shows the key switching waveforms of the prior art conventional current-doubler topology of FIG. 1.
Figure 1B:
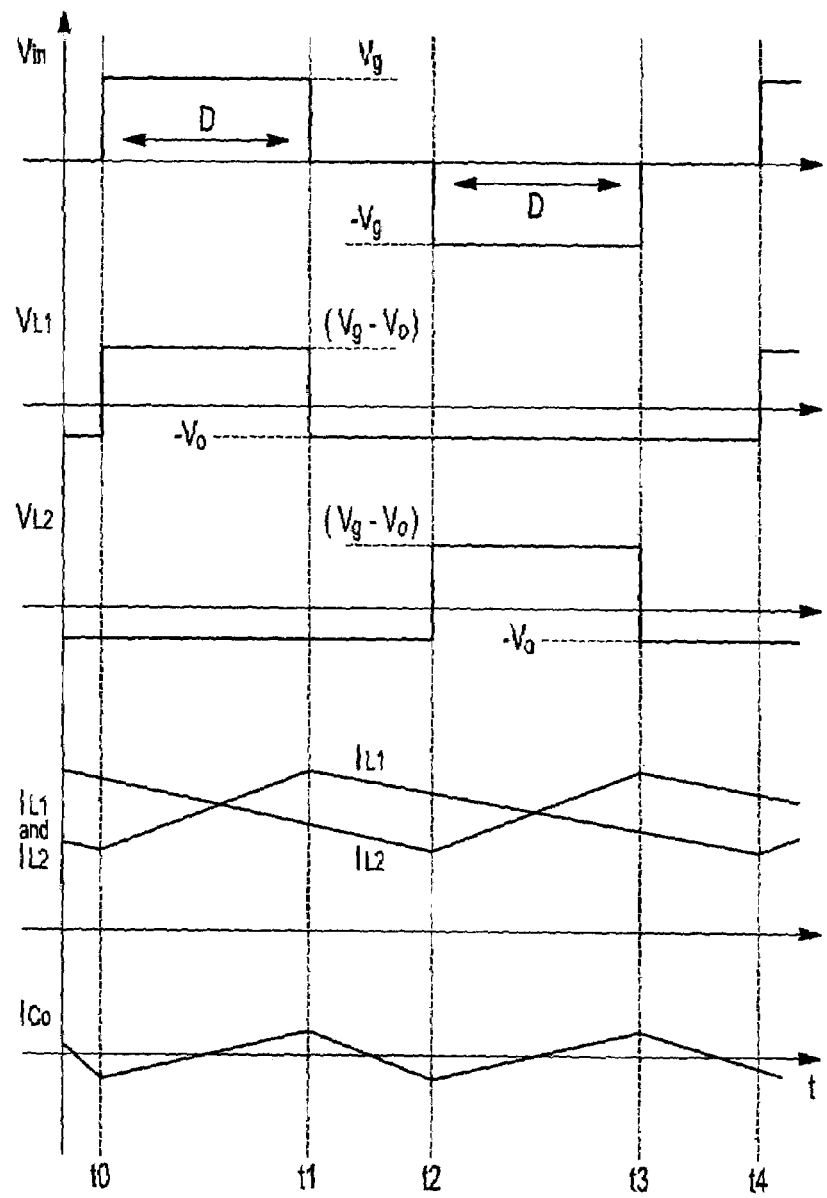
Figure 2B:
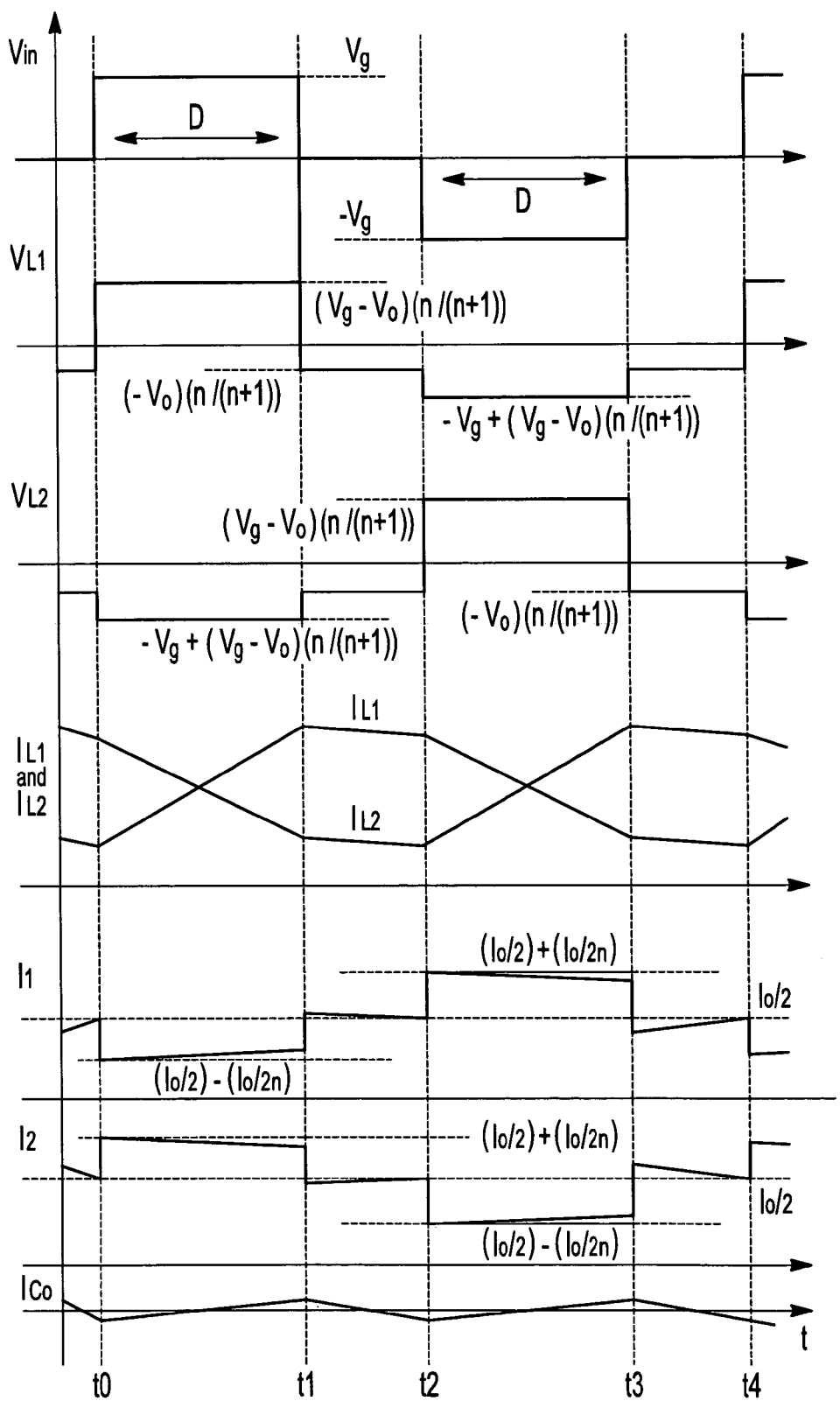
FIG. 2B shows the key switching waveforms of the coupled-inductors current-doubler topology of FIG. 2A.

FIG. 2B shows the main switching waveforms of the CICD topology 200 when a symmetric control scheme is used to control the primary switching devices of the DC-DC converter, such as DC-DC converter 650 (FIG. 6B), in which CICD topology 200 is used. The coupling configuration of the CICD topology 200 causes the shape of the voltage across $L_1$ and $L_2$ to change from the shape shown in FIG. 1B for the conventional current-doubler topology 100 of FIG. 1A to the shape shown in FIG. 2B for the CICD topology 200. This causes the currents through $L_1$ and $L_2$ to be also re-shaped as shown in FIG. 2B and to have more of a tendency to cancel.

Theoretical Analysis and Key Design Equations

Based on FIGS. 1 and 2, the theoretical analysis and key design equations of the CICD topology 200 compared to the CCD topology 100 is presented in the following discussion.

A. Gain Equation. By applying the volt-second balance method across the inductors $L_1$, $L_2$ the gain equations for the CICD topology 200 and the CCD topology 100 can be derived as follows:

$$\frac{V_o}{V_g} = \frac{n-1}{n} D, n > 1 \quad \text{(CICD Topology Gain Equation)} \quad \text{(Equation 2)}$$

$$\frac{V_o}{V_g} = D \quad \text{(CCD Topology Gain Equation)} \quad \text{(Equation 3)}$$

Figure 3:
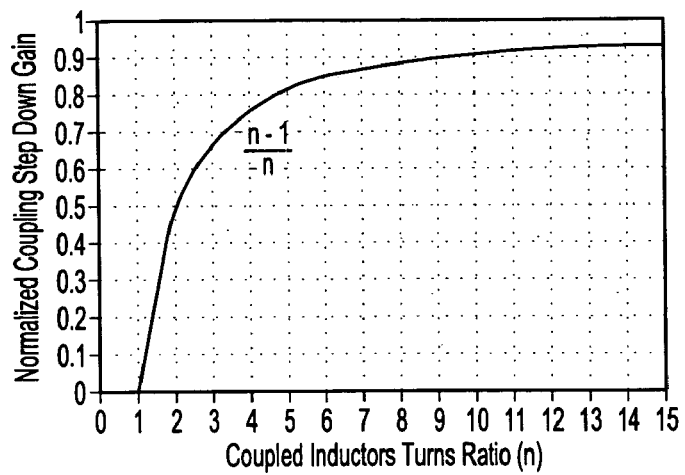
FIG. 3 is a graph showing normalized coupling step-down voltage gain of the coupled-inductors current-doubler topology of FIG. 2A compared to the conventional current-doubler topology of FIG. 1A.

FIG. 3 shows the additional voltage step-down ratio that results from the coupling, in other words, the ratio between Equations (2) and (3). It can be noticed that larger voltage step-down is achieved as n decreases and becomes closer to 1. When n=1, the output voltage becomes zero. A larger duty cycle can be achieved in the case of the CICD topology 200 compared to the CCD topology 100 assuming the same $V_g$.

B. Output Current Ripple Equation From FIGS. 1B and 2B, and by using the slopes of the step up and step down currents through the inductors $L_1$, $L_2$ the output current ripple equations for CICD topology 200 and CCD topology 100 can be derived as:

$$\Delta i_{co-CICD} = \frac{n^2 V_o}{V_g(n^2-1)\cdot(n+1)} \cdot \frac{(n-1)V_g - 2nV_o}{L \cdot f_s} \quad \text{(Equation 4)}$$

$$= \left[\frac{n}{n+1}\right]^2 \cdot (1-2D) \cdot$$

$$\frac{V_o}{L \cdot f_s} \quad \text{(CICD Topology Output Current Ripple)}$$

$$\Delta i_{co-CCD} = \frac{V_o}{V_g} \cdot \frac{V_g - 2V_o}{L \cdot f_s} \quad \text{(Equation 5)}$$

$$= (1 - 2D) \cdot \frac{V_o}{L \cdot f_s}$$

(CCD Topology Output Current Ripple)

where $f_s$ is the switching frequency.

A way to compare Equations (4) and (5) is to take the ratio between them to yield:

$$\frac{\Delta i_{co-CICD}}{\Delta i_{co-CCD}} = \left[\frac{n}{n+1}\right]^2 \, n > 1 \quad \text{(Equation 6)}$$

Figure 4:
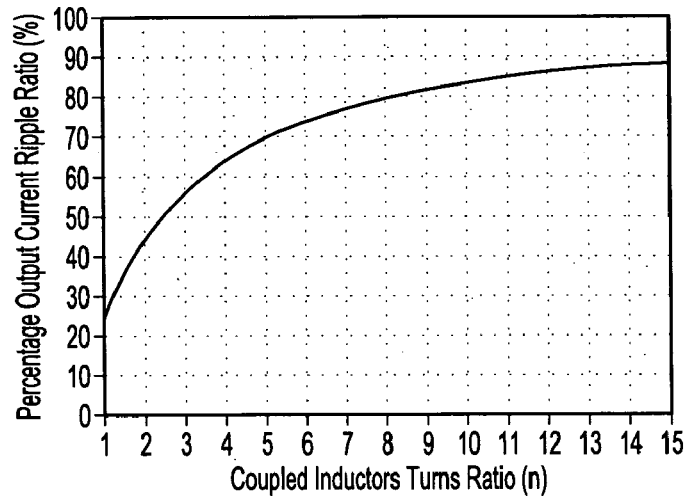
FIG. 4 is a graph showing the percentage output current ripple ratio versus the turns ratio of the coupled-inductors current-topology of FIG. 2A compared to the conventional current-doubler topology of FIG. 1A.

FIG. 4 shows the plot of Equation (6) versus n, i.e., the output current ripple ratio between the CICD and the CCD secondary topologies 200, 100, respectively. As can be noted from FIG. 4, the CICD topology 200 current ripple decreases compared to the CCD topology 100 as n decreases. For example, when n=2, the output current ripple of the CICD topology 200 is about 45% of the output current ripple of the CCD topology 100. Therefore, even though the current ripple of each inductor $L_1$, $L_2$ separately is larger for the CICD topology 200 compared to the current ripple of each inductor $L_1$, $L_2$ separately for the CCD topology 100, the total output current of the CICD topology 200 is smaller.

C. Input Voltage and Input Current. As can be seen from Equations (2) and (3), to keep the same design for the same output voltage and output current at the same duty cycle for both the CICD topology 200 and CCD topology 100, the input voltage $V_{g\text{-}CICD}$ of the CICD topology 200 should be larger than the input voltage $V_{g\text{-}CCD}$ of the CCD topology 100 as follows:

$$V_{g-CICD} = \frac{n}{n-1} \cdot V_{g-CCD} \, n > 1 \quad \text{(Equation 7)}$$

Therefore, the input current $i_{g\text{-}CICD}$ of the CICD topology 200 is smaller than the input current $i_{g\text{-}CCD}$ of the CCD topology 100 as follows:

$$i_{g-CICD} = \frac{n}{n-1} \cdot i_{g-CCD} \, n > 1 \quad \text{(Equation 8)}$$

This current is the secondary side current of the isolation transformer when an isolated topology is used with any primary side, such as half-bridge and full-bridge DC-DC converters. Hence, the isolation transformer secondary side current is lower for the CICD topology 200, which can reduce the secondary side winding losses especially for high output currents.

D. Switches—Voltage and Current Stresses The voltage stress on the switches used in DC-DC converters having CCD topology 100 and in DC-DC converters having CICD topology 200 can be obtained by applying simple KVL for the loop which include one of the switches, yielding:

$$V_{switch-CICD} = V_{g-CICD} \cdot \frac{n-1}{n} = \frac{V_o}{D}, n > 1 \quad \text{(Equation 9)}$$

(CICD Topology Switch Voltage Stress)

$$V_{switch-CCD} = \quad \text{(Equation 10)}$$

$$V_{g-CCD} = \frac{V_o}{D} \text{ (CICD Topology Switch Voltage Stress)}$$

By comparing Equations (9) and (10) to Equation (7) that govern the relationship between $V_{g\text{-}CCD}$ and $V_{g\text{-}CICD}$, it can be noticed that the voltage stress across the switches of both the CCD topology 100 and the CICD topology 200 is the same for the same output voltage and design.

For the same output current, the current stress for the switches in DC-DC converters having the CCD topology 100 or the CICD topology 200 is also the same since the full load current ($I_o$) will flow through one of the switches that is turned ON when the other switch is turned OFF in either case.

E. Inductors Average and RMS Currents. The average current per inductor $L_1$, $L_2$ is equal to half of the output current in the CICD topology 200. Considering the rms current per inductor $L_1$, $L_2$, if it is assumed that the inductors $L_1$, $L_2$ are large enough for the ripple to be very small for both topologies, the rms inductor current for the CICD topology 200 can be derived as follows:

$$i_{rms-CICD} \approx \frac{I_o}{2} \cdot \sqrt{\frac{2D + n^2}{n^2}} \quad \text{(Equation 11)}$$

Taking the ratio between the rms inductor current and the average inductor current of the CICD topology yields:

$$\frac{i_{rms-CICD}}{i_{avg-CICD}} \approx \sqrt{\frac{2D + n^2}{n^2}} \quad \text{(Equation 12)}$$

Figure 5:
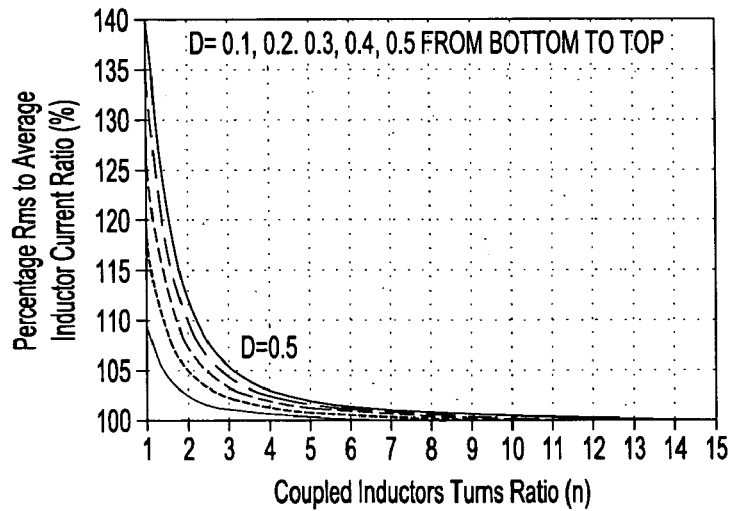
FIG. 5 is a graph showing the percentage rms to average inductor current ratio versus the turns ratio for the coupled-inductors current-doubler topology of FIG. 2A.

FIG. 5 shows equation (12) plotted as a function of n and D. As shown in FIG. 5, as n increases and D decreases, the rms to average inductor current ratio decreases making the rms current value closer to the average current value. For example, for n=2 and D=0.35, the rms inductor current is less than 9% larger than the average inductor current.

Power Converter Topologies

As the case for the CCD topology 100, the CICD topology 200 can be used in many isolated DC-DC converter topologies as the secondary side of the DC-DC converter, such as in the half-bridge and full bridge DC-DC converters, and with different control schemes. FIG. 6A shows a prior art isolated half-bridge DC-DC converter 600 with the CCD topology 100 as the secondary side. DC-DC converter 600 includes a primary side 602 and CCD topology 100 coupled by an isolation transformer $T_1$. Primary side 602 is conventional and includes first and second primary or power switches $S_1$, $S_2$ coupled to a DC input voltage $V_{in}$, and capacitors $C_1$, $C_2$ also coupled to input voltage $V_{in}$. A junction 604 of capacitors $C_1$, $C_2$ is coupled to one side of a primary winding 606 of transformer $T_1$ and a junction 608 of switches $S_1$, $S_2$ is coupled to the other side of primary winding 606. $L_k$ designates the leakage inductance of transformer $T_1$. The control of switches $S_1$, $S_2$ can be symmetric or asymmetric, by way of example and not of limitation.

FIG. 6B shows an isolated half-bridge DC-DC converter 650 having a primary side 602 and CICD topology 200 as the secondary side coupled by isolation transformer $T_1$. Primary side 602 of DC-DC converter 650 is identical to primary side 602 of DC-DC converter 600 of FIG. 6A and CICD topology 200 is as described above. Again, the control of switches $S_1$, $S_2$ can be symmetric or asymmetric, by way of example and not of limitation.

Comparison Summary between CICD and CCD Topologies and Design Considerations

As shown above in the theoretical discussion, larger output voltage step-down ratios can be achieved by the CICD topology 200 compared to the conventional CCD topology 100. Moreover, the output current ripple is reduced in the CICD topology 200. It must be noted that even though in the CCD topology 100 the ripple can be reduced as D becomes closer to 0.5, in practical designs D is not designed to be equal to 0.5 for many reasons such as to be able to have regulation band (band to change D) and not to create a short circuit condition by overlapping the primary switches $S_1$, $S_2$ (FIG. 6A) ON times. On the other hand, in the case of the CICD topology 200, for any value of D, smaller ripple can be achieved by choosing the appropriate turns ration n for the coupled inductors. Symmetric transient response can be also achieved for the CICD topology 200 by choosing the appropriate n value to make the output current step-up slope and step-down slopes equal.

Even though for the same output voltage and current a larger input voltage and smaller input current is required in the case of the CICD topology 200 compared to the CCD topology 100, it was shown above that the voltage and current stresses on the primary switches $S_1$, $S_2$ did not change from the CCD topology 100 to the CICD topology 200. In fact, since input current in the CICD topology 200, which is the isolation transformer secondary side current in isolated topologies, is smaller, the conduction loss may be smaller and the required diameter of the secondary winding of the transformer will be smaller. Moreover, since part or all of the voltage step-down is achieved by the coupled inductors of the CICD topology 200, fewer turns in the primary winding of the isolation transformer are needed. Hence, a smaller isolation transformer can be used. However, the rms current of the inductors $L_1$, $L_2$ in the CICD topology 200 is a function of n and D and is better designed to be close to the average current to reduce conduction losses, which was reduced at the CICD input terminals. In practical designs of the CICD topology 200, it is fair to say that the rms current will be larger than the average current in the inductors $L_1$, $L_2$ by about 10% to 20%.

Even though the coupling coefficient k of the coupled inductors should be designed as close as possible to one and with minimum leakage inductance to achieve better performance in the CICD topology 200, a small leakage inductance still exists in practical designs. This leakage inductance should be designed to be as small as possible for better performance. When this leakage inductance is very small, it can be utilized toward achieving soft switching for the primary side switches, such as switches $S_1$, $S_2$ of DC-DC converter 650 (FIG. 6B), in addition to the isolation transformer leakage inductance and it may reduce the reverse recovery losses of the primary switches by reducing di/dt.

Simulation Results

The half-bridge DC-DC converter 600 with the CCD topology 100 used as the secondary side (FIG. 6A) and the DC-DC converter 650 with the CICD topology 200 used as the secondary side (FIG. 6B) were simulated using Pspice/Orcad to verify the theoretical results discussed above. Input and output voltages for both simulations were $V_{in}$=36V~75V and $V_o$=3.3V, respectively, at full load current $I_o$=20 A. The switching frequency was equal to $f_s$=300 KHz. To achieve the same duty cycle of about D=0.3~0.35 at a nominal input voltage of $V_{in}$=48V, the isolation transformer turns ratio for the CCD topology 100 simulation schematic was made equal to $n_t$=2 and was made equal to $n_t$=1 in for CICD topology 200 simulation with the step down in the CICD topology 200 achieved by a coupled inductors turns ratio that was equal to n=2. An inductor value of L=3 $\mu$H was used for $L_1$, $L_2$. In the simulation for the CICD topology 200, the 3 $\mu$H inductance was divided into 2.4 $\mu$H for the main inductors $L_1$, $L_2$ and 0.6 $\mu$H for the coupled inductors $L_{11}$, $L_{22}$ (in series with the secondary rectifiers $D_1$, $D_2$) to realize a coupling ratio of n=2 while keeping the total inductance equal to 3 $\mu$H.

Figure 7:
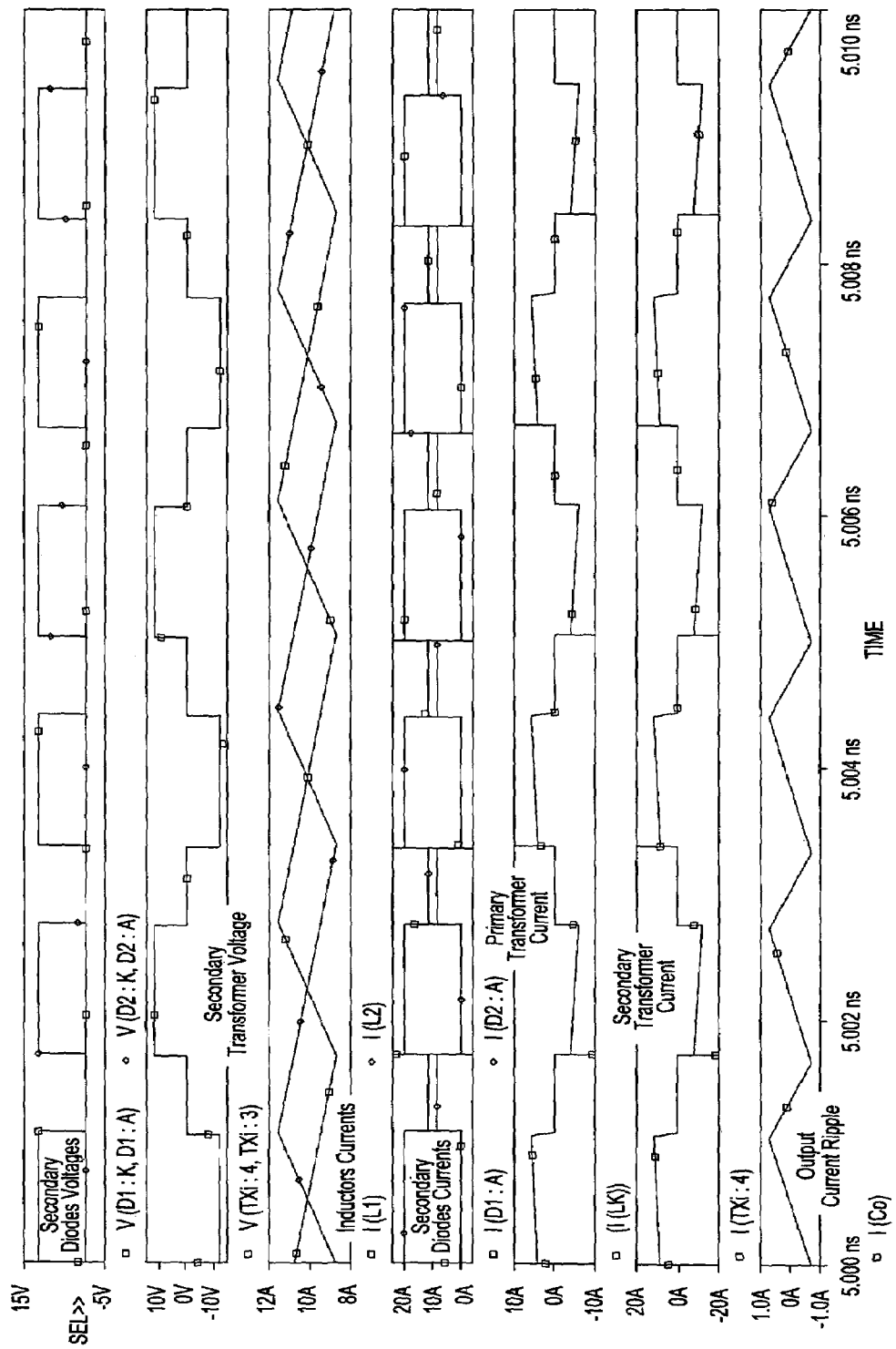
FIG. 7 shows simulation waveforms for the DC-DC converter of FIG. 6A using the conventional current-doubler topology of FIG. 1A as the secondary side.
Figure 8:
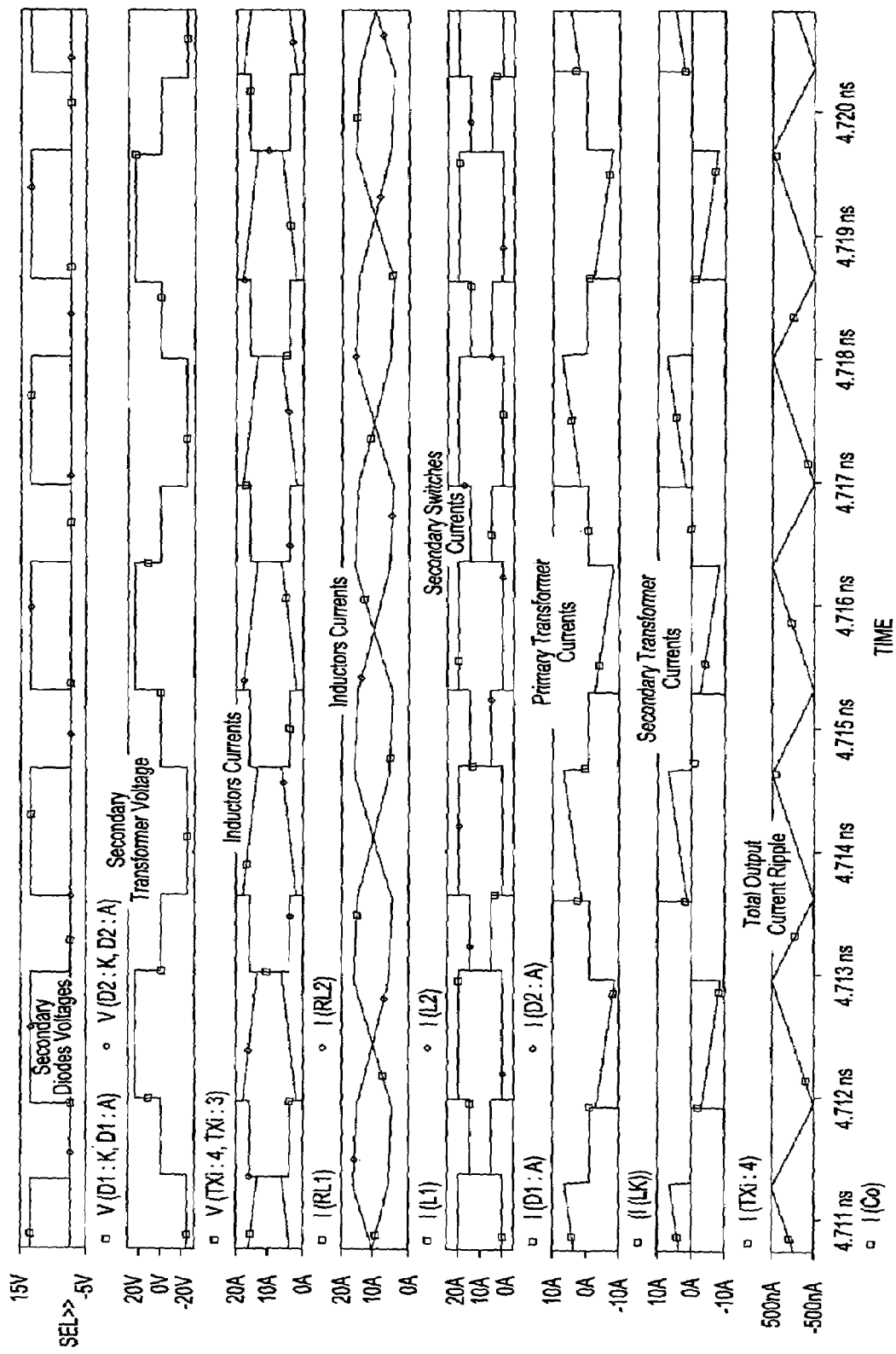
FIG. 8 shows simulation waveforms for the DC-DC converter of FIG. 6B using the coupled-inductors current-doubler topology of FIG. 2A as the secondary side in accordance with an aspect of the invention.

FIG. 7 shows the simulation waveforms for DC-DC converter 600 (FIG. 6A) having CCD topology 100 while FIG. 8 shows the simulation waveforms for DC-DC converter 650 (FIG. 6B) having CICD topology 200. These simulation waveforms agree with the theoretical results discussed above for the voltage step-down, current ripple, and voltage and current stresses.

Experimental Results

Prototypes of half-bridge DC-DC converter 600 (with CCD topology 100 for its secondary side) and half-bridge DC-DC converter 650 (with CICD topology 200 for its secondary side) were built in the laboratory to verify the theoretical and simulation results discussed above. Input and output voltages for both prototypes were $V_{in}$=36V~75 V and $V_o$=3.3 V, respectively, at full load current $I_o$=20 A. The switching frequency was equal to $f_s$=300 KHz.

To achieve the same duty cycle of about D=0.3~0.35 at the nominal input voltage of $V_{in}$=48V, the isolation transformer turns ratio for the conventional CCD prototype was made equal to $n_t$=2, while it was made equal to $n_t$=1 in the CICD prototype while the step down is achieved by the coupled inductors turns ratio that was equal to n=2. Main inductors $L_1$, $L_2$ were set at L=3 $\mu$H.

Figure 9A:
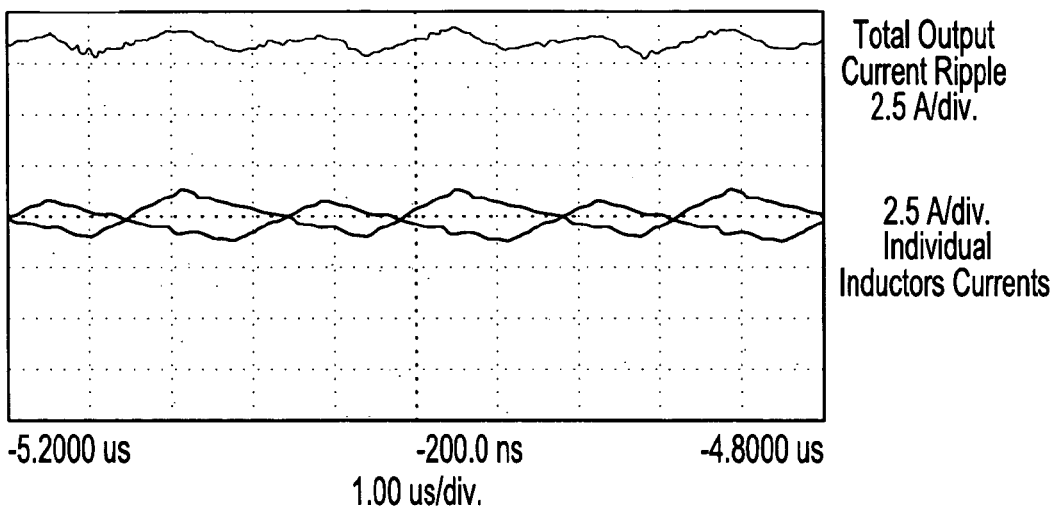
FIGS. 9A and 9B show the experimental waveforms for DC-DC converter 600 (FIG. 6A) having conventional current-doubler topology 100.
Figure 9B:
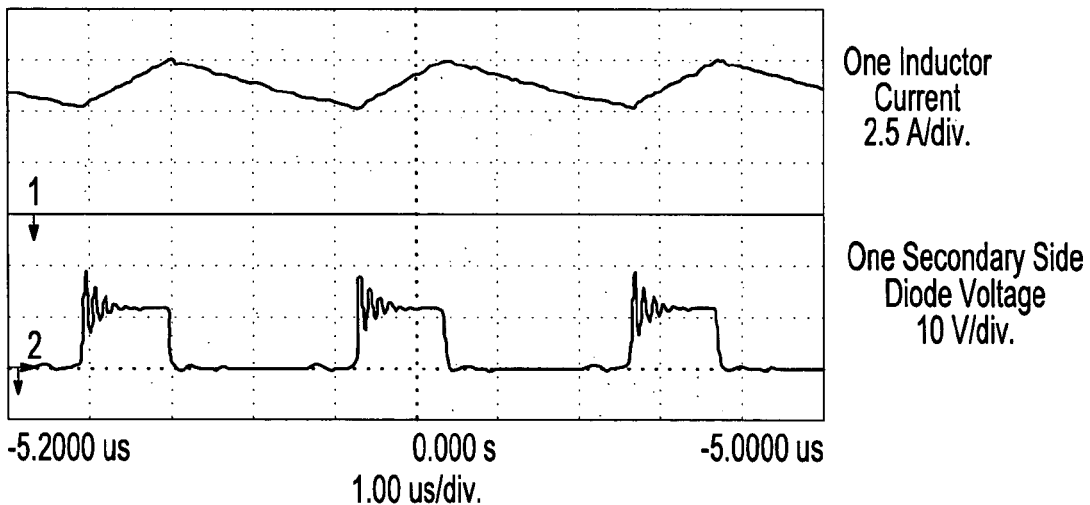
Figure 10A:
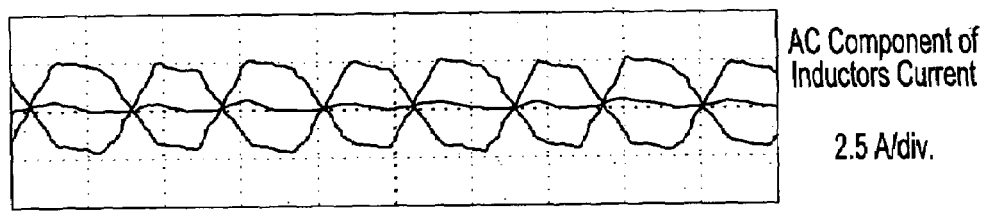
FIGS. 10A and 10B show the experimental waveforms for DC-DC converter 650 (FIG. 6B) having coupled-inductors current-doubler topology 200 in accordance with an aspect of the invention.
Figure 10B:
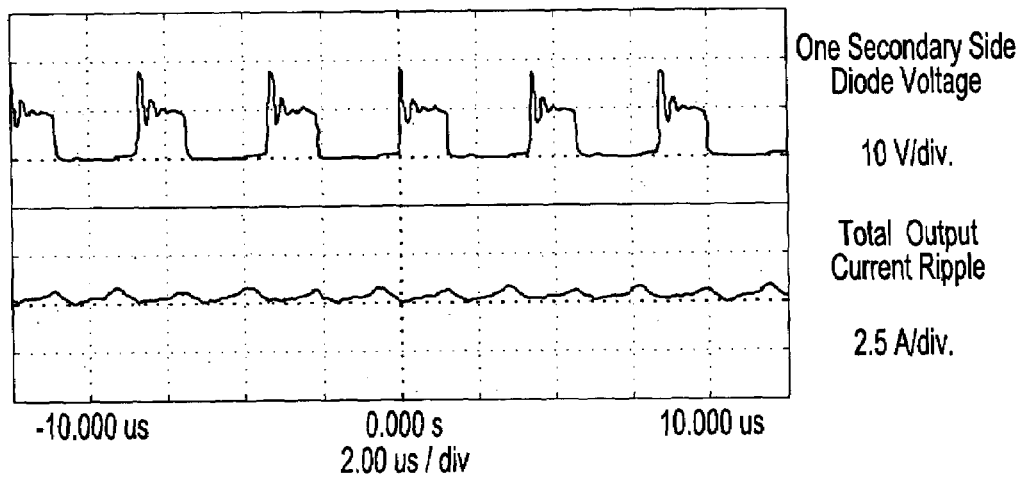

FIGS. 9A and 9B show the experimental waveforms for DC-DC converter 600 (FIG. 6A) having CCD topology 100 while FIGS. 10A and 10B show the experimental waveforms for DC-DC converter 650 (FIG. 6B) having CICD topology 200. These waveforms agree with the theoretical results discussed above for the voltage step-down, current ripple, and voltage and current stresses. However, because the leakage inductance for the coupled inductors in the CICD topology 200 could not be controlled in the laboratory, the individual inductor current waveforms for the CICD topology 200 look slightly different than the theoretical waveforms. Reducing this leakage inductance should achieve better results.

HBB Topologies

Figure 11:
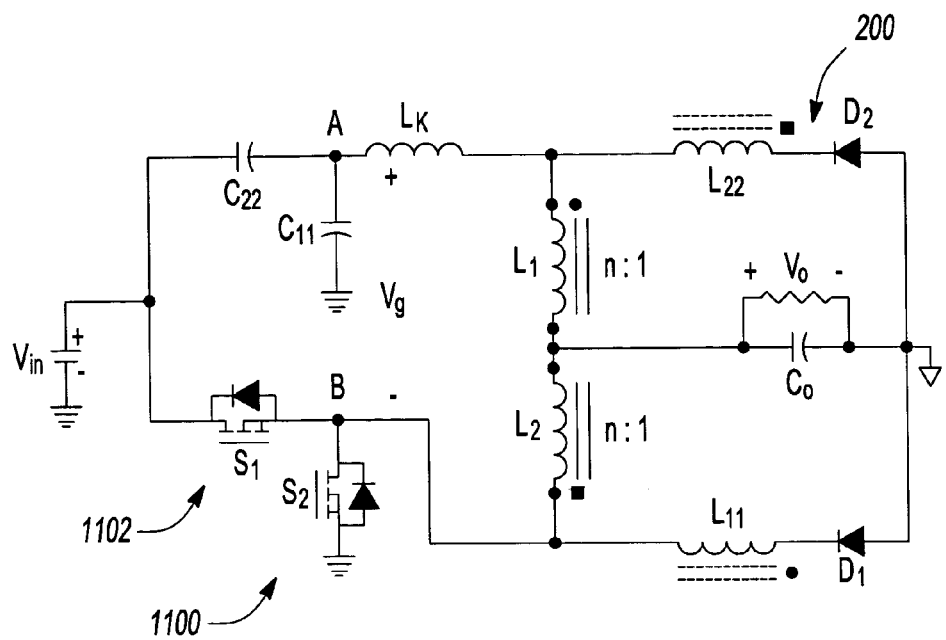
FIG. 11 is a schematic of a non-isolated half-bridge buck topology in accordance with an aspect of the invention using the coupled-inductors current-doubler topology of FIG. 2A.

CICD topology 200 can be advantageously used in non-isolated topologies. FIG. 11 shows a non-isolated half-bridge-buck (HBB) topology 1100 that utilizes the CICD topology 200 and FIG. 12 shows a HBB two-stage converter topology 1200 with the CICD topology 200 as the second stage.

Referring to FIG. 11, non-isolated HBB topology 1100 includes a half-bridge buck (HBB) converter 1102 coupled to CICD topology 200. HBB 1102 includes first switch and second switches $S_1$, $S_2$, and first and second capacitors $C_{11}$, $C_{22}$. One side of switch $S_1$ is coupled to a voltage source $V_{in}$ and a second side of switch $S_1$ is coupled to a first side of switch $S_2$, with the other side of switch $S_2$ coupled to ground. One side of capacitor $C_{22}$ is coupled to voltage source $V_{in}$ and the other side of capacitor $C_{22}$ is a coupled to a first side of capacitor $C_{11}$, the other side of capacitor $C_{11}$ being coupled to ground. CICD topology 200 is coupled to the junction of capacitors $C_{22}$, $C_{11}$ and to the junction of switches $S_1$, $S_2$ at nodes A and B. $L_k$ designates the leakage inductance of the coupled-inductors 202, 204.

Figure 12:
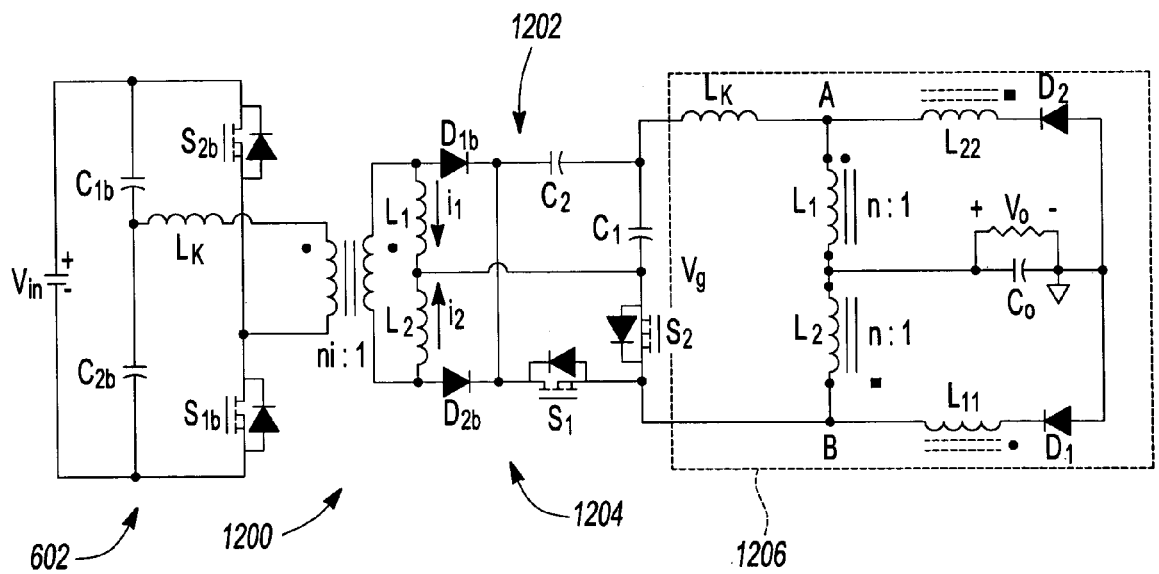
FIG. 12 is a schematic of a two stage half-bridge buck topology in accordance with an aspect of the invention using the coupled-inductors current-doubler topology of FIG. 2A as the second stage.

Referring to FIG. 12, HBB two-stage converter topology 1200 includes a primary side, such as primary side 602 (FIG. 6A) and a two-stage secondary side 1202 coupled to primary side 602 by isolation transformer $T_1$. The first stage of secondary side 1202 includes a half-bridge-buck converter topology and will be referred to as HBB 1204. HBB 1204 feeds a second stage 1206, which is CICD topology 200.

HBB 1204 includes first and second switches $S_1$, $S_2$, and first and second capacitors $C_1$, $C_2$. A first side of switch $S_1$ is coupled to the cathode of diode $D_{2b}$ and the other side of switch $S_1$ is coupled to a first side of switch $S_2$. The other side of switch $S_2$ is coupled to a first side of capacitor $C_1$ and to the junction of inductors $L_{1b}$, $L_{2b}$. The other sides of inductors $L_{1b}$, $L_{2b}$ are coupled to opposite sides of the secondary winding of isolation transformer $T_1$ and to anodes of diodes $D_{1b}$, $D_{2b}$, respectively. The other side of capacitor $C_1$ is coupled to a first side of capacitor $C_2$ and the other side of capacitor $C_2$ is coupled to the cathodes of diodes $D_{1b}$, $D_{2b}$. CICD topology 200 is coupled to the junction of capacitors $C_1$, $C_2$ and to the junction of switches $S_1$, $S_2$ of HBB 1202.

The HBB topology with the CICD topology 200 provides a voltage step-down ratio of two because of the half-bridge configuration in addition to the voltage step-down provided by the coupled inductors of CICD topology 200, which can provide an extended duty cycle especially at low-output voltages compared to the two-phase buck topology. Moreover, when the HBB topology is driven symmetrically, the current sharing between its two channels is achieved without the need for current sharing control because of the balance that capacitors $C_{11}$ and $C_{22}$ provide, and when asymmetric control is used, soft-switching can be achieved for $S_1$ and $S_2$, which can not be achieved in a two-phase buck converter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coupled-inductor current-doubler topology for a power converter, comprising:
    first and second rectifiers; and
    a first coupled inductor that is magnetically separated from a second coupled inductor, each coupled inductor having a main inductor inductively coupled with a secondary inductor, the secondary inductor of the first coupled inductor electrically coupled in series with one of the first and second rectifiers and the secondary inductor of the second coupled inductor electrically coupled in series with the other one of the first and second rectifiers.

2. The coupled-inductor current-doubler topology of claim 1 wherein each of the main inductors of the first and second coupled inductors have first and second sides and are electrically coupled in series with the second side of the main inductor of the first coupled inductor electrically coupled to the first side of the main inductor of the second coupled inductor, the secondary inductor of the first coupled inductor electrically coupled in series between the first rectifier and the second side of the main inductor of the second coupled inductor, the secondary inductor of the second coupled inductor electrically coupled in series between the second rectifier and the first side of the main inductor of the first coupled inductor.

3. A coupled-inductors current-doubler topology for a power converter, comprising:
    first and second rectifiers;
    a first coupled inductor that is magnetically separated from a second coupled inductor, each coupled inductor having a main inductor inductively coupled with a secondary inductor, each main inductor having a first side and a second side;
    the main inductors electrically coupled together in series with the second side of the main inductor of the first coupled inductor electrically coupled to the first side of the main inductor of the second coupled inductor;
    the secondary inductor of the second coupled inductor electrically coupled in series with the second rectifier and the main inductor of the first coupled inductor; and
    the secondary inductor of the first coupled inductor electrically coupled in series with the first rectifier and the main inductor of the second coupled inductor.

4. The coupled-inductor current-doubler topology of claim 3 wherein the secondary inductor of the first coupled inductor is electrically coupled between the second side of the main inductor of the second coupled inductor and the first rectifier and the secondary inductor of the second coupled inductor is electrically coupled between the first side of the main inductor of the first coupled inductor and the second rectifier.

5. The coupled-inductor current-doubler topology of claim 3 wherein the rectifiers are selected from the group essentially consisting of diodes and synchronous rectifiers.

6. A power converter, comprising:
    at least a first side coupled to a second side by a transformer;
    the second side including a current-doubler; and
    the current-doubler having first and second rectifiers, a first coupled inductor that is magnetically separated from a second coupled inductor, each coupled inductor being magnetically separated from the transformer and having a main inductor inductively coupled to a secondary inductor, the main inductors electrically coupled to a secondary winding of the transformer and the secondary inductors electrically coupled in series with respective ones of the first and second rectifiers.

7. The power converter of claim 6 wherein the secondary inductors are electrically coupled in series between respective ones of the first and second rectifiers and respective junctions of the main inductors and the secondary winding of the transformer.

8. The power converter of claim 6 wherein the main inductor of a first one of the coupled inductors has a first side electrically coupled to a first side of the secondary winding of the transformer at a first junction and a second side electrically coupled to a first side of the main inductor of the second one of the coupled inductors, the main inductor of the second one of the coupled inductors having a second side electrically coupled to a second side of the secondary winding of the transformer at a second junction, the secondary inductor of the first coupled inductor electrically coupled in series between one of the rectifiers and the second junction, the secondary inductor of the second coupled inductor electrically coupled in series between the second one of the rectifiers and the first junction.

9. The power converter of claim 8 wherein the power converter is a DC-DC converter.

10. The power converter of claim 6 wherein the first and second rectifiers are synchronous rectifiers.

11. The power converter of claim 6 wherein the first and second rectifiers are diodes.

12. A power converter, comprising
   a half-bridge buck topology coupled to a coupled-inductors current-doubler topology, the coupled-inductors current-topology including:
      first and second rectifiers; and
      a first coupled inductor that is magnetically separated from a second coupled inductor, each coupled inductor having a main inductor inductively coupled with a secondary inductor, the secondary inductor of the first coupled inductor electrically coupled in series with one of the first and second rectifiers and the secondary inductor of the second electrically coupled inductor coupled in series with the other one of the first and second rectifiers.

13. The power converter of claim 12 wherein each of the main inductors of the first and second coupled inductors have first and second sides and are electrically coupled in series with the second side of the main inductor of the first coupled inductor electrically coupled to the first side of the main inductor of the second coupled inductor, the secondary inductor of the first coupled inductor electrically coupled in series between the first rectifier and the second side of the main inductor of the second coupled inductor, the secondary inductor of the second coupled inductor electrically coupled in series between the second rectifier and the first side of the main inductor of the first coupled inductor.

14. A power converter, comprising:
   a primary side coupled to a secondary side by a transformer, the secondary side including a half-bridge buck topology coupled to a coupled-inductors current-doubler topology, the coupled-inductors current-topology including:
      first and second rectifiers; and
      a first coupled inductor that is magnetically separated from a second coupled inductor, each coupled inductor being magnetically separated from the transformer and having a main inductor inductively coupled with a secondary inductor, the secondary inductor of the first coupled inductor electrically coupled in series with one of the first and second rectifiers and the secondary inductor of the second coupled inductor electrically coupled in series with the other one of the first and second rectifiers.

15. The power converter of claim 14 wherein each of the main inductors of the first and second coupled inductors have first and second sides and are electrically coupled in series with the second side of the main inductor of the first coupled inductor electrically coupled to the first side of the main inductor of the second coupled inductor, the secondary inductor of the first coupled inductor electrically coupled in series between the first rectifier and the second side of the main inductor of the second coupled inductor, the secondary inductor of the second coupled inductor electrically coupled in series between the second rectifier and the first side of the main inductor of the first coupled inductor.

* * * * *

UNITED STATES PATENT AND TRADEMARK OFFICE
CERTIFICATE OF CORRECTION

PATENT NO. : 6,982,887 B2 Page 1 of 1
APPLICATION NO. : 10/832103
DATED : January 3, 2006
INVENTOR(S) : Issa Batarseh et al.

It is certified that error appears in the above-identified patent and that said Letters Patent is hereby corrected as shown below:

<u>Column 5,</u>
Line 52, $$" \quad i_{g\text{-}CICD} = \frac{n}{n-1} \cdot i_{g\text{-}CCD} \qquad n>1 \quad "$$

should be $$i_{g\text{-}CICD} = \frac{n-1}{n} \cdot i_{g\text{-}CCD} \qquad n>1$$

--.

<u>Column 6,</u>
Line 12, "CICD" should be --CCD--.

Signed and Sealed this

Twelfth Day of December, 2006

JON W. DUDAS
*Director of the United States Patent and Trademark Office*